Aug. 7, 1962 J. F. MORGAN ETAL 3,048,132
SEED PELLET DISPENSER AND PLANTER
Filed Oct. 12, 1959 2 Sheets-Sheet 1
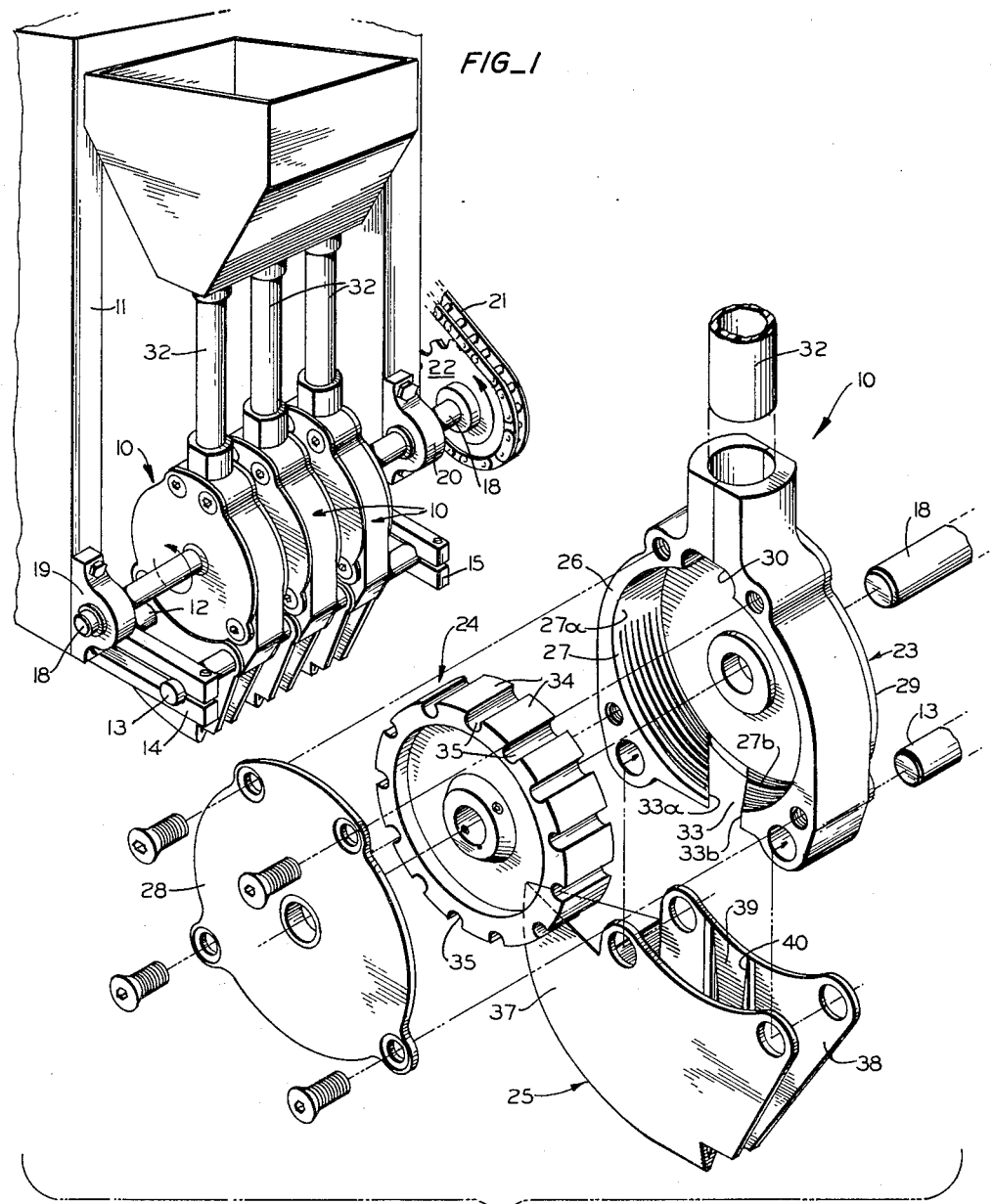
FIG_1
FIG_2
INVENTORS:
JOHN F. MORGAN
& CHARLES E. GRAY
BY Meelin and Hanscom
ATTORNEYS Aug. 7, 1962  J. F. MORGAN ETAL  3,048,132
SEED PELLET DISPENSER AND PLANTER
Filed Oct. 12, 1959  2 Sheets-Sheet 2
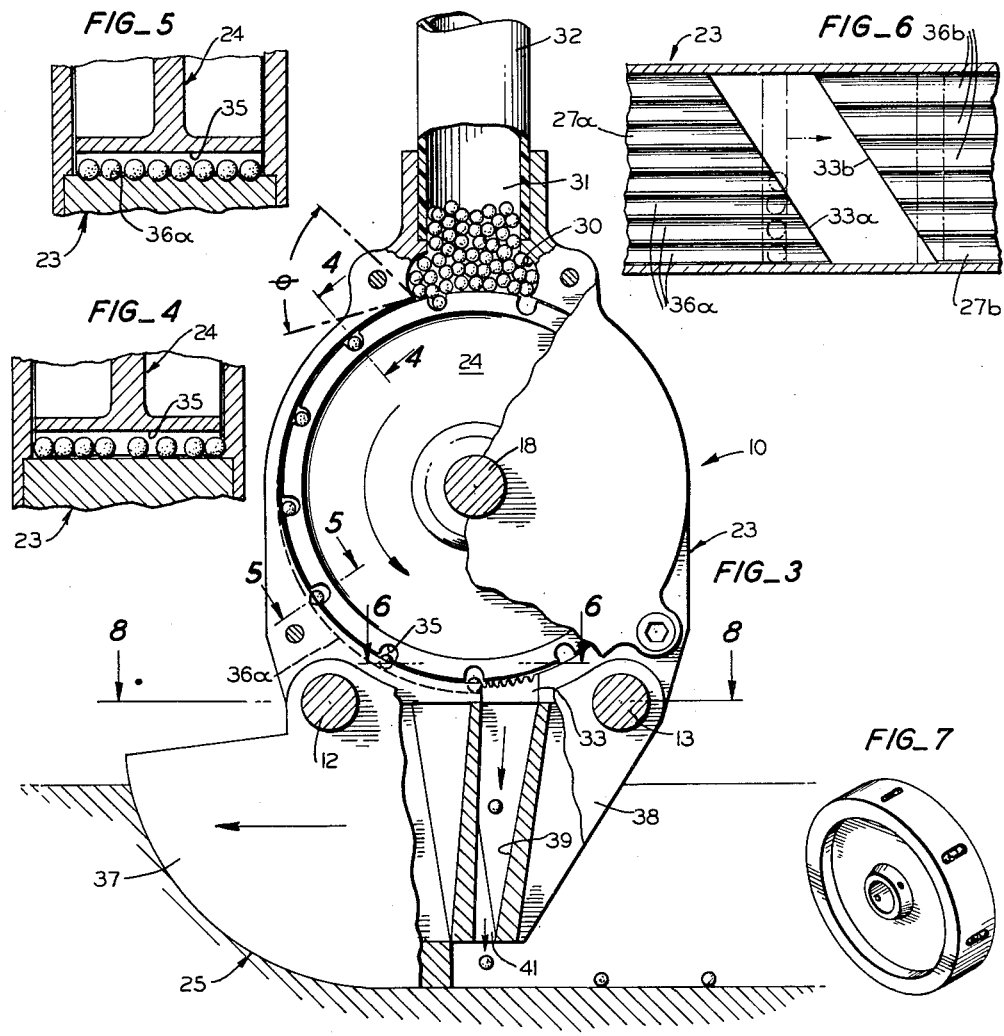
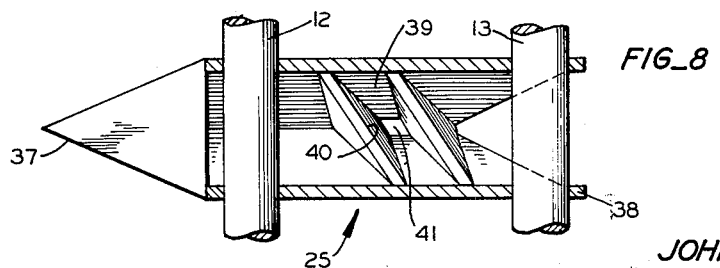
INVENTORS:
JOHN F. MORGAN
& CHARLES E. GRAY
BY Meelin and Hanscom
ATTORNEYS

United States Patent Office 3,048,132
Patented Aug. 7, 1962

3,048,132
SEED PELLET DISPENSER AND PLANTER
John F. Morgan, 5508 W. Monterosa, Glendale, Ariz., and Charles E. Gray, 9406 W. Polk, Tolleson, Ariz.
Filed Oct. 12, 1959, Ser. No. 845,790
5 Claims. (Cl. 111—77)

This invention relates to seed planter apparatus and more particularly, involves an apparatus which is used for dispensing and precisely depositing a row of seed in a freshly made furrow. The dispenser machine is particularly suited for handling coated seeds, such as now used by growers of lettuce, egg-plant, spinach, cabbage, onion and other vegetables.

It is one subject of this invention to provide a novel dispenser apparatus capable of receiving a quantity of seeds or pellets from a bulk container and continuously dispensing a single seed or pellet at a time.

Another object is to provide a dispenser apparatus having a continuously rotating seed wheel which carries a line of seeds or pellets across an oblique dispensing edge, whereby each of the seeds in said line arrives at said dispensing edge at a different time instant.

A more specific object is to provide a dispenser device for pellets and the like comprising a frame housing having an inner circular cylindrical surface portion interrupted by first and second openings, said first opening adapted for feeding pellets into said housing, said second opening providing an oblique dispensing edge; a pellet wheel rotatably mounted within the curvature of said inner housing surface and having outer circular cylindrical surface portions complementary thereto, said outer surface portions being separated by a plurality of angularly-spaced and axially-formed grooves; a funnel disposed beneath said dispensing opening for receiving pellets from any point along said oblique dispensing edge and directing them to a common point of discharge, and means for rotating said wheel.

It is another object of this invention to provide a dispenser device as described by the preceding objects and also having a plurality of guide grooves formed in a supporting surface for separating each seed in the line being advanced and guiding said seed to a particular point in the dispensing edge.

Another object is to provide a seed dispenser apparatus as described in the above objects and also having two grooved seed-supporting surfaces intersected by a single dispensing edge, thereby enabling the device to be used alternatively for two sizes of seeds simply by reversing the direction of a wheel movement.

Another object of this invention is to provide a dispenser device which is particularly suitable for use in planting seeds in that a row of seeds may be deposited in a furrow, each seed in said row being spaced approximately an equal distance apart.

It is still another object to provide a seed planter, including a dispenser device of the kind described by the above objects, said planter also having a furrow shoe and a funnel means which are adapted for receiving seeds or pellets from the dispensing edge of said dispenser and depositing them in a precise fashion in the bottom of a freshly made furrow.

Other objects of this invention will become apparent to those skilled in the art, particularly in view of the drawings and the following description.

In the drawings forming a part of this application and wherein like reference numerals represent like parts throughout the same, FIG. 1 is a perspective view of a battery of seed planter devices, each device embodying the elements of this invention and being connected to a common hopper bin;

FIG. 2 is an exploded view of one embodiment of this invention particularly showing the interrelationship of its parts and suggesting its method of assembly;

FIG. 3 is a side elevation of the seed planter of FIGS. 1 and 2, certain portions of the housing structure and mountings being broken away and shown in section;

FIG. 4 is a section taken on lines 4—4 of FIG. 3;

FIG. 5 is a section taken on lines 5—5 of FIG. 3;

FIG. 6 is a section taken on lines 6—6 of FIG. 3;

FIG. 7 is a perspective view of another embodiment of a feed wheel; and

FIG. 8 is a section taken on lines 8—8 of FIG. 3.

Referring more particularly to FIG. 1 of the drawings, there is shown a practical arrangement of seed planting devices, which devices are contemplated by this invention. The seed planters 10 are mounted in parallel upon carriage 11 of a moving vehicle, and as they are moved over the ground each planter device will cut a furrow and deposit a single row of seeds therein. The arrangement of three seed planters, as shown, is now being used by many vegetable growers, but gangs of two to twelve are also used as may be required or desired by the grower.

Each of the seed planters is mounted upon a pair of spaced parallel support rods 12 and 13 which in turn are mounted to cantilevers 14 and 15 projecting rearwardly of the carriage. Also, it will be noted, the seed planters are set on a common shaft 18 which is journaled in bearings 19 and 20 and adapted to be rotated by a power source through drive chain 21 and sprocket 22. The angular speed at which the shaft 18 is rotated will determine the speed of the seed-dispensing action. And, thus, by controlling the speed of shaft rotation in relation to the speed of the vehicle, which is propelled over the ground, the spacing between seeds may be increased, decreased or maintained at a constant distance.

FIG. 2 shows an exploded view of a single seed planter having embodied therein the ideas of this invention. In terms of broad inclusion the planter comprises a frame housing 23, a seed wheel 24 rotatably mounted therein and a furrow shoe 25 having a funnel means disposed beneath a dispensing opening provided in the housing. It will be apparent from the drawings that feed wheel 24 is rigidly mounted upon shaft 18 and is rotated in the housing past a superposed seed compartment. Seeds from the compartment will fall into grooves formed in the peripheral surface of wheel 24, and are carried to a seed dispensing opening in the bottom of the housing. As the seeds drop through the opening they are funneled through furrow shoe 25 and deposited in the bottom of a furrow which is being formed by the toe of the shoe.

More particularly, housing 23 is made up of a frame 26 having an inner circular cylindrical surface portion 27 and a pair of annular enclosure plates 28 and 29. Surface portion 27 is interrupted by a first opening 30 which connects to a seed compartment 31 and into which seeds or pellets are continuously fed through a tubular connection 32 from a hopper, such as illustrated in FIG. 1. A second opening 33 is provided in the lowermost portion of the housing, interrupting surface portion 27 and providing a pair of dispensing edges 33a and 33b.

Seed wheel 24 is rotatably mounted within the curvature of cylindrical surface 27 and has outer circular cylindrical surface portions 34 complementary thereto. Surface portions 34 are separated by a plurality of angularly and uniformly spaced seed grooves 35 which are designed of sufficient axial length to receive a line of seeds or pellets therein, and are of a circumferential width slightly greater than the diameter of a single pellet. Accordingly, as the wheel is rotated past seed compartment 31 a line of seeds will be deposited into each exposed axial groove, and since the peripheral surfaces 34 lie in close abutting relation to surface 27, the seeds are trapped upon that surface as the wheel continues to rotate. Depending upon the direction of wheel rotation, the seeds which are retained in grooves 35 are then advanced to either dispensing edge 33a or 33b.

The dispensing edges of opening 33 and the angularly spaced grooves 35 are complementally inclined to one another to provide a controlled pellet dispensing action. In the preferred embodiment shown, the edges 33a and 33b are obliquely inclined to the angular direction of seed wheel rotation, and grooves 35 are formed parallel to the axis of wheel rotation. It will be best observed in FIG. 6 that as a particular line of seeds is advanced toward the dispensing edge 33a each seed in said line arrives at a point of the edge at a different instant. In this way each seed is separately dispensed through opening 33. If seed wheel 24 is rotated in the opposite direction, the lines of seed would be advanced toward edge 33b and a similar dispensing action would be obtained.

It will be obvious that only one dispensing edge may be provided in order to obtain the dispensing action contemplated. However, unique and distinctive advantages are obtained by forming the housing 23 with symmetrical interior circular surface portions and providing a second dispensing edge at the opposite side of opening 33. In this way the angles at which these edges are inclined may be selected differently, thereby providing a selection in the spacing between the seeds. Also, and as clearly contemplated by the embodiment of FIGS. 3–6, surface portions 27a and 27b may be used to dispense a different size of seed.

Cylindrical surface 27a is formed with a plurality of parallel seed-guide grooves 36a, each groove being generated from the axis of surface curvature and one groove being provided for each seed in a contemplated line of seeds. Grooves 36a may be started intermediate the openings 30 and 33; the grooves terminate at the dispensing opening 30 as shown in FIGS. 3 and 6. As wheel 24 is rotated and a seed-filled groove 35 is moved into abutting relation with surface 27a, the seeds are free to move axially in the groove (FIG. 4). When a particular groove reaches approximately a quarter-turn the seeds therein begin to roll into the guide grooves and are thereby uniformly spaced across the width of surface 27a. The seeds are retained in both grooves 35 and 36a until each seed arrives at a point upon the dispensing edge of opening 33 where it falls into the funnel means of furrow shoe 25.

A similar arrangement of guide grooves 36b is also provided upon surface 27b. As shown in FIG. 6, grooves 36b are different in number (6) from the number of grooves 36a (8). As indicated above, this permits the use of two sizes of seeds in the planter, and the dispensing action will accordingly be controlled by the angular direction of seed wheel rotation. The function and manner of operation in the reverse rotational direction is the same as that which has been described.

In FIG. 7 there is shown another embodiment of a seed wheel having axial grooves which form seed pockets in the peripheral surface thereof. The pockets thus formed may be of a controlled size such that a particular number of seeds will be picked up from the seed compartment as the wheel is rotated. It will also be noted that the angular spacing of these axial grooves (or pockets) is greater than the spacing of the grooves in the embodiment of FIGS. 1–6. This construction will produce spaces between the last dispensed seed of one groove and the first dispensed seed of the succeeding groove. Such a construction is of particular advantage in planting certain types of vegetables such as corn where it is desired that three seeds be closely planted (as in a cluster) and yet provide relatively large spacing between the first and last seeds of adjacent grooves.

Seed compartment 31 is particularly designed to prevent the grinding of the seeds and/or forcing them into grooves 35. The lip of compartment opening 30 is formed with an acute angle $\theta$, and as seeds are moved toward this lip they are urged upwardly away from the seed wheel, thereby removing all seeds in excess of that which each groove is designed to carry. Also, opening 30 is of larger size than the opening between tubular connection 32 and compartment 31. Thus, the weight of the seeds in the hopper and connection 32 is transmitted over a greater surface area of seed wheel 24, reducing the pressure and eliminating the tendency to grind the seed.

Furrow shoe 25 is mounted beneath the dispenser housing 23 and has a ground engaging toe portion 37 which terminates in a suspended heel section 38. The shoe is generally wedge-shaped, thereby being adapted for cleaving the ground and making a furrow. A funnel 39 is formed in the shoe and extends between a slot opening 40, which is disposed directly under dispensing opening 33, and a relatively small seed-discharge port 41 through the heel section. With this construction a seed may be fed through opening 33 from any point along the dispensing edge and directed to a common point of discharge and deposited in a freshly made furrow.

If a different size of seed is to be used requiring the use of surface portion 27b and edge 33b, the dispenser housing is disconnected from the shoe and rotated 180° about the tubular connection 32; then the shoe is reconnected. The operation of the reversely mounted dispenser and furrow shoe is in all material respects identical to that shown in FIG. 3.

While preferred embodiments of this invention are shown and described various changes may be made in the size, shape and arrangement of certain parts without departing from the spirit of the invention or the scope of the attached claims, and each of these changes is contemplated.

Having thus described my invention, what I claim and desire to secure by Letters Patent is:

1. A dispenser device for pellets and the like comprising a frame housing having an inner circular cylindrical surface portion interrupted by first and second openings, said first opening adapted for feeding pellets into said housing, said second opening providing a dispensing edge, a plurality of parallel guide grooves formed in a portion of said surface between said first and second openings and terminating at said dispensing edge; a pellet wheel rotatably mounted within the curvature of said inner housing surface and having outer circular cylindrical surface portions complementary thereto, said outer surface portions being separated by a plurality of grooves formed in the periphery of said wheel, each of said grooves being spaced apart angularly around said wheel, extending crosswise in the peripheral face thereof and adapted for receiving a line of pellets therein; said dispensing edge and said angularly spaced grooves being complementally inclined to one another to provide a controlled pellet dispensing action from said guide grooves which exposes and dispenses a single pellet at a time from a given line of pellets; and means for rotating said wheel.

2. The dispenser device of claim 1 wherein the plurality of grooves formed in the periphery of said wheel are formed parallel with the rotatable axis of said wheel.

3. The dispenser device of claim 2 wherein said dispensing edge is formed such that points at opposite ends of said edge are spaced angularly apart relative to said rotatable axis a distance approximately equal to but slightly less than the angular distance between adjacent angularly spaced grooves of said wheel.

4. The dispenser device of claim 1 and further comprising a second plurality of guide grooves different in number from said first plurality, formed in a second portion of said surface between said first and second openings and terminating at said second opening.

5. The dispenser device of claim 1 and further comprising a furrow shoe mounted beneath said dispenser housing and having a ground-engaging toe portion terminating in a suspended heel section, said shoe including a funnel therein, said funnel having a slot opening beneath the second opening of said housing and a vertical seed discharge port through the heel section of said shoe.

References Cited in the file of this patent

UNITED STATES PATENTS

| | | |
|---|---|---|
| 202,625 | Avery | Apr. 23, 1878 |
| 826,079 | Aikele | July 17, 1906 |
| 2,164,066 | Holle | June 27, 1939 |
| 2,569,421 | Larson | Sept. 25, 1951 |
| 2,749,856 | Fleming | June 12, 1956 |
| 2,753,037 | Davis | July 3, 1956 |

FOREIGN PATENTS

| | | |
|---|---|---|
| 981,619 | France | Jan. 17, 1951 |
| 997,428 | France | Sept. 12, 1951 |
| 403,676 | Germany | Oct. 6, 1924 |
| 352,162 | Great Britain | July 9, 1931 |
| 502,005 | Italy | Nov. 26, 1954 |